United States Patent
Evans et al.

(10) Patent No.: US 6,409,175 B1
(45) Date of Patent: Jun. 25, 2002

(54) EXPANDABLE JOINT CONNECTOR

(75) Inventors: M. Edward Evans, Spring; D. Scott Costa, Kingwood; James N. Brock, The Woodlands, all of TX (US)

(73) Assignee: Grant Prideco, Inc., The Woodlands, TX (US)

( * ) Notice: Subject to any disclaimer, the term of this patent is extended or adjusted under 35 U.S.C. 154(b) by 0 days.

(21) Appl. No.: 09/352,815

(22) Filed: Jul. 13, 1999

(51) Int. Cl.$^7$ ................................................ F16L 17/00
(52) U.S. Cl. ..................... 277/314; 277/602; 277/608; 277/619; 285/382.1; 285/351; 29/523
(58) Field of Search ................................ 277/602, 619, 277/625, 627, 616, 946, 323, 336, 337, 342, 300, 308, 311; 285/351, 382.1, 382.2, 382.4; 166/127, 313, 381; 29/507, 523, 524; 403/274, 281

(56) References Cited

U.S. PATENT DOCUMENTS

| | | | |
|---|---|---|---|
| 2,907,589 A | * | 10/1959 | Knox |
| 3,813,751 A | * | 6/1974 | Smida |
| 3,888,496 A | * | 6/1975 | Dryet |
| 3,997,193 A | * | 12/1976 | Tsuda et al. |
| 4,026,583 A | * | 5/1977 | Gottlieb |
| 4,099,745 A | | 7/1978 | Cobbs |
| 4,253,687 A | * | 3/1981 | Maples |
| 4,324,407 A | * | 4/1982 | Upham et al. |
| 4,325,571 A | | 4/1982 | Funderburg et al. |
| 4,388,752 A | | 6/1983 | Vinciguerra et al. |
| 4,487,434 A | | 12/1984 | Roche |
| 4,494,601 A | * | 1/1985 | Pratt et al. |
| 4,530,527 A | | 7/1985 | Holmberg |
| 4,576,386 A | * | 3/1986 | Benson et al. |
| 4,580,788 A | * | 4/1986 | Rabe et al. |
| 4,590,995 A | * | 5/1986 | Evans |
| 4,662,663 A | | 5/1987 | Schmitz et al. |
| 4,711,474 A | * | 12/1987 | Patrick |
| 4,791,796 A | | 12/1988 | Ford |
| 4,805,430 A | | 2/1989 | Schmitz |
| 4,827,748 A | | 5/1989 | Herring |
| 4,887,646 A | * | 12/1989 | Groves |
| 4,893,844 A | * | 1/1990 | Chelette et al. |

(List continued on next page.)

FOREIGN PATENT DOCUMENTS

| | | | |
|---|---|---|---|
| AT | 0174521 | * | 4/1953 |
| DE | 2458188 | * | 6/1975 |
| EP | 0272511 A | * | 7/1988 |
| GB | 2211573 A | * | 7/1989 |

Primary Examiner—Anthony Knight
Assistant Examiner—Vishal Patel
(74) Attorney, Agent, or Firm—Carlos A. Torres; Loren G. Helmreich; Browning, Bushman P.C.

(57) ABSTRACT

Methods and apparatus are provided for obtaining a secure mechanical connection and a pressure-tight seal in the overlapping area of two telescoping tubular bodies. The two bodies, including the overlapping area, are radially expanded to increase the inside diameter of the bodies. The expansion forces an annular seal in the overlapping area into a pressure-sealing engagement between the bodies. A string of pipe assembled from joints secured to each other by telescoping, threadedly engaged expanded pin and box connections may be radially expanded into a surrounding well bore to provide a cased well having an internal diameter greater than the original internal diameter of the pipe string. The seal in the connection comprises an annular elastomeric seal ring and an annular Teflon spacer ring carried in a specially dimensioned groove formed in either the box or the pin, or both members of the connection. Radial expansion of the connection causes axial contraction of the groove, which acts with the spacer ring to expand the seal ring radially to seal the annular space created between the expanded pin and box.

46 Claims, 10 Drawing Sheets

U.S. PATENT DOCUMENTS

| | | |
|---|---|---|
| 4,949,791 A | 8/1990 | Hopmann et al. |
| 5,101,906 A | 4/1992 | Carlin et al. |
| 5,156,043 A * | 10/1992 | Ose |
| 5,306,052 A | 4/1994 | MeGushion |
| 5,348,095 A | 9/1994 | Worrall et al. |
| 5,370,425 A * | 12/1994 | Dougherty et al. |
| 5,794,985 A | 8/1998 | Mallis |
| 5,845,945 A * | 12/1998 | Carstensen |
| 5,921,441 A * | 7/1999 | Small et al. |
| 5,944,107 A * | 8/1999 | Ohmer |

* cited by examiner

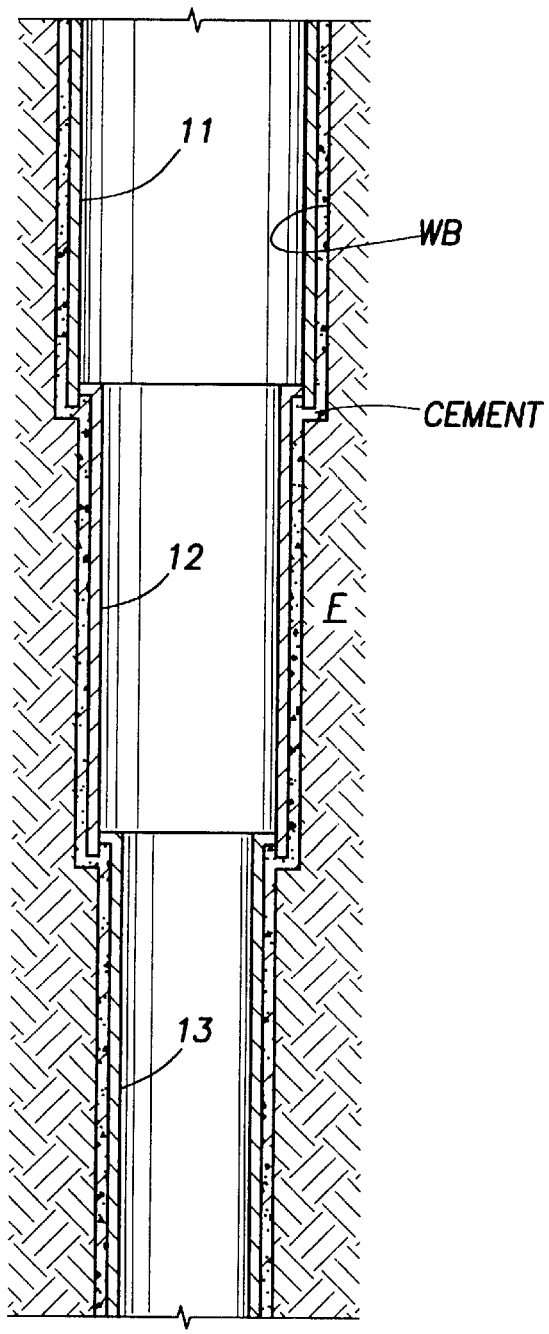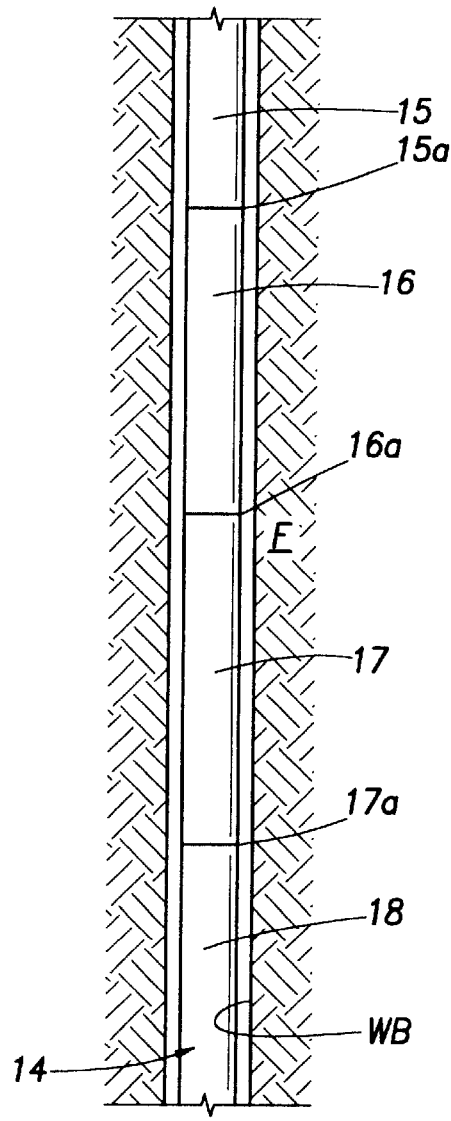
FIG. 1
(PRIOR ART)
FIG. 2

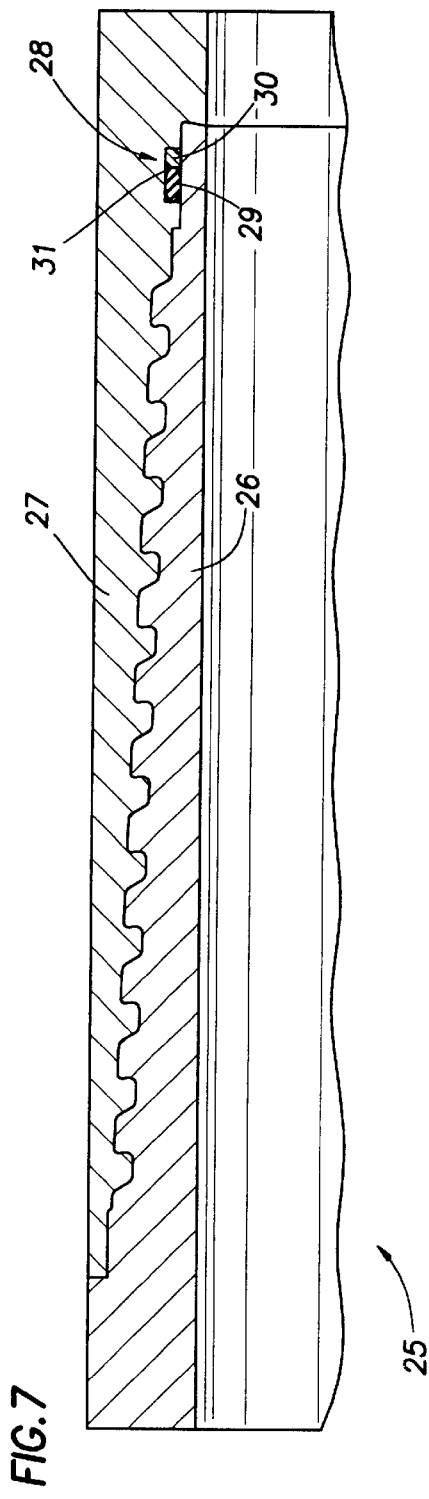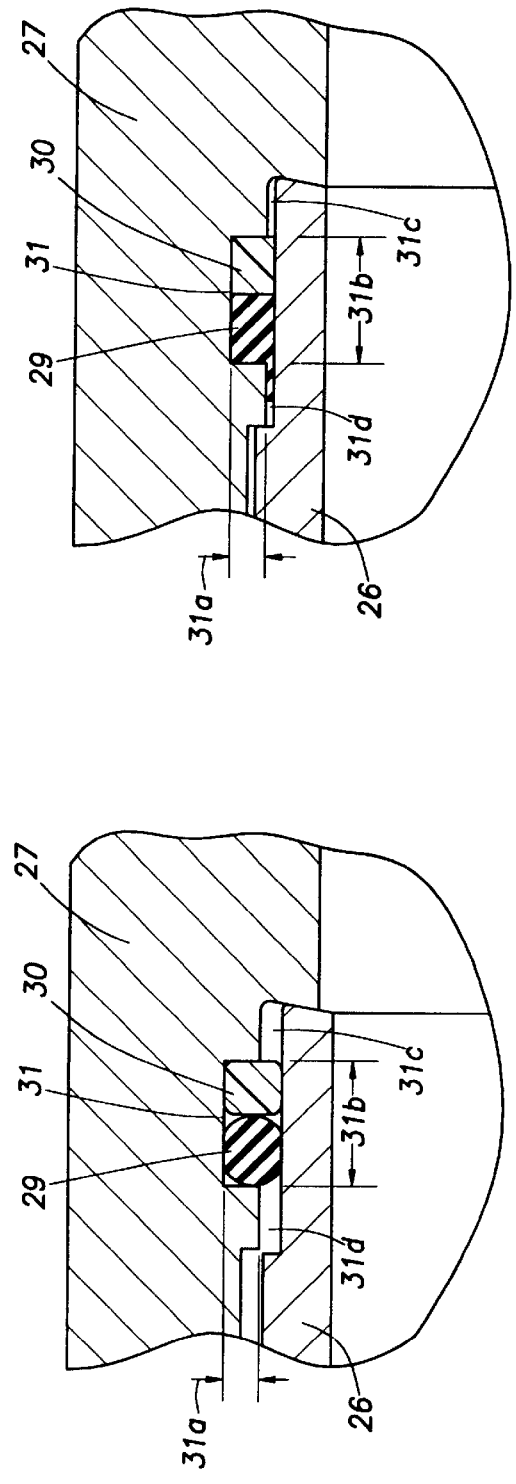

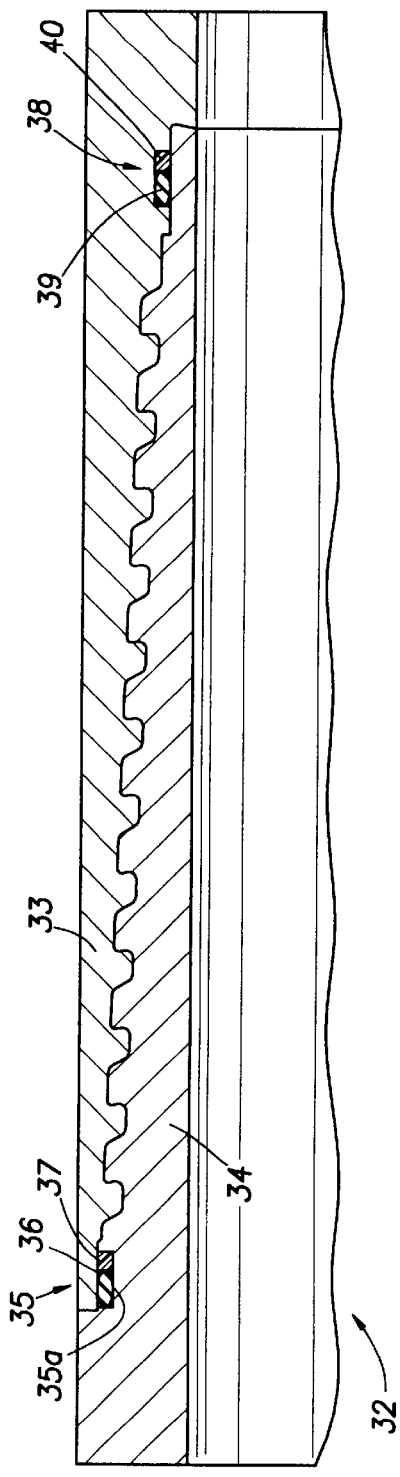
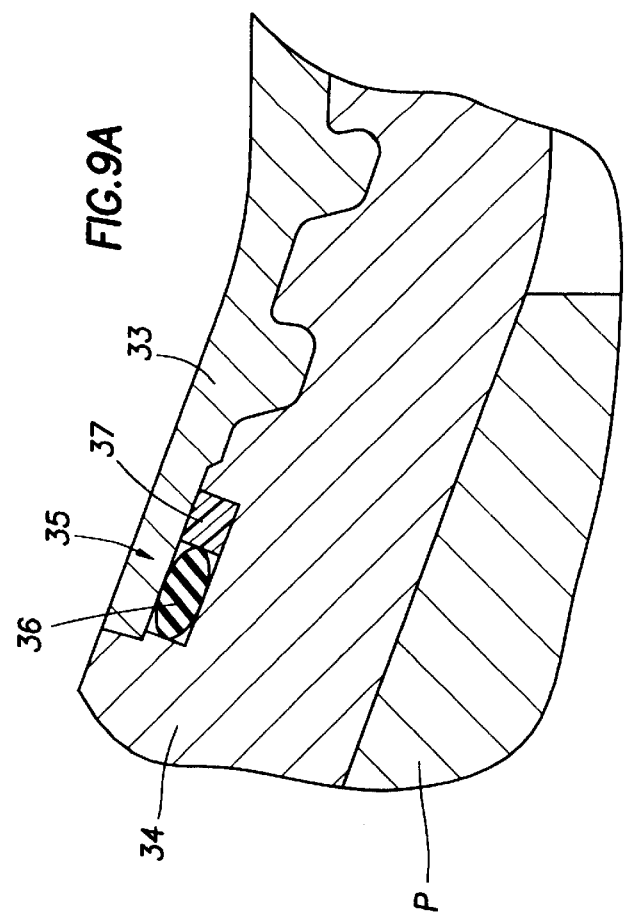
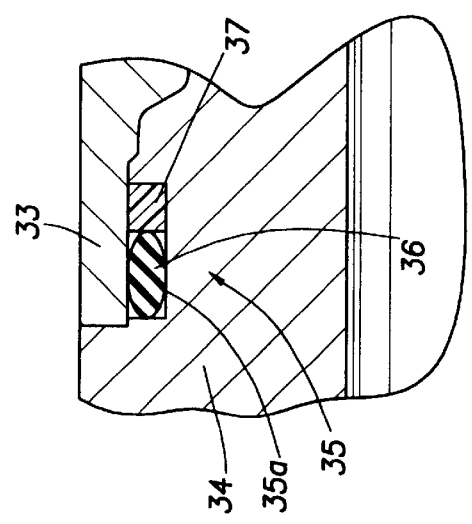

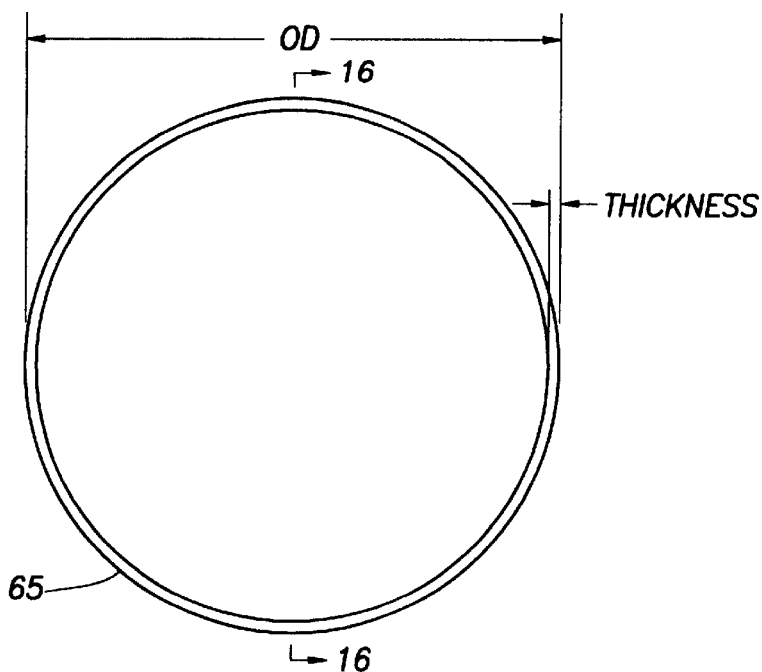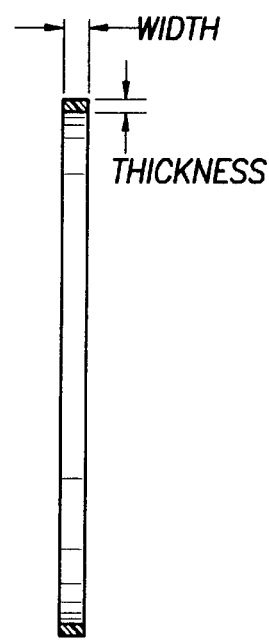
FIG.15  FIG.16
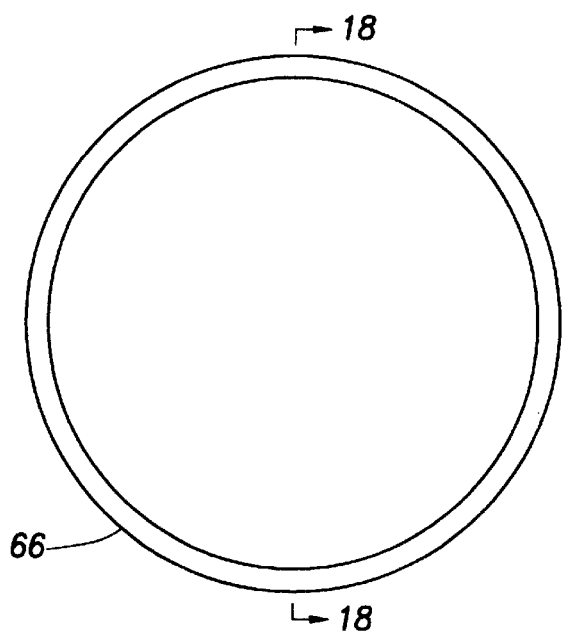
FIG.17  FIG.18

FIG. 19

| PERCENT EXPANSION OF PIPE BODY | O-RING CROSS SECTION | GROOVE WIDTH (W/POSITION RING) | % POSITION RING VOLUME OF GROOVE | % O-RING VOLUME OF GROOVE | % GROOVE VOLUME NOT FILLED |
|---|---|---|---|---|---|
| 10% | 0.070"±0.003" | 0.156"±0.002" | >49.5% | <41.0% | <9.5% |
| 20% | 0.070"±0.003" | 0.156"±0.002" | >49.5% | <41.0% | <9.5% |
| 10% | 0.103"±0.003" | 0.205"±0.002" | >54.0% | <36.0% | <10.0% |
| 20% | 0.103"±0.003" | 0.205"±0.002" | >54.0% | <36.0% | <10.0% |
| 10% | 0.139"±0.003" | 0.250"±0.002" | >60.0% | <30.0% | <10.0% |
| 20% | 0.139"±0.003" | 0.250"±0.002" | >60.0% | <30.0% | <10.0% |

FIG. 20

| PERCENT EXPANSION OF PIPE BODY | O-RING CROSS SECTION | GROOVE WIDTH (W/POSITION RING) | % SQUEEZE BEFORE EXPANSION | REQUIRED % SQUEEZE AFTER EXPANSION |
|---|---|---|---|---|
| 10% | 0.070"±0.003" | 0.156"±0.002" | <28.0% | >26.0% |
| 20% | 0.070"±0.003" | 0.156"±0.002" | <28.0% | >16.0% |
| 10% | 0.103"±0.003" | 0.205"±0.002" | <28.0% | >25.0% |
| 20% | 0.103"±0.003" | 0.205"±0.002" | <28.0% | >16.5% |
| 10% | 0.139"±0.003" | 0.250"±0.002" | <26.5% | >20.0% |
| 20% | 0.139"±0.003" | 0.250"±0.002" | <26.5% | >15.0% |

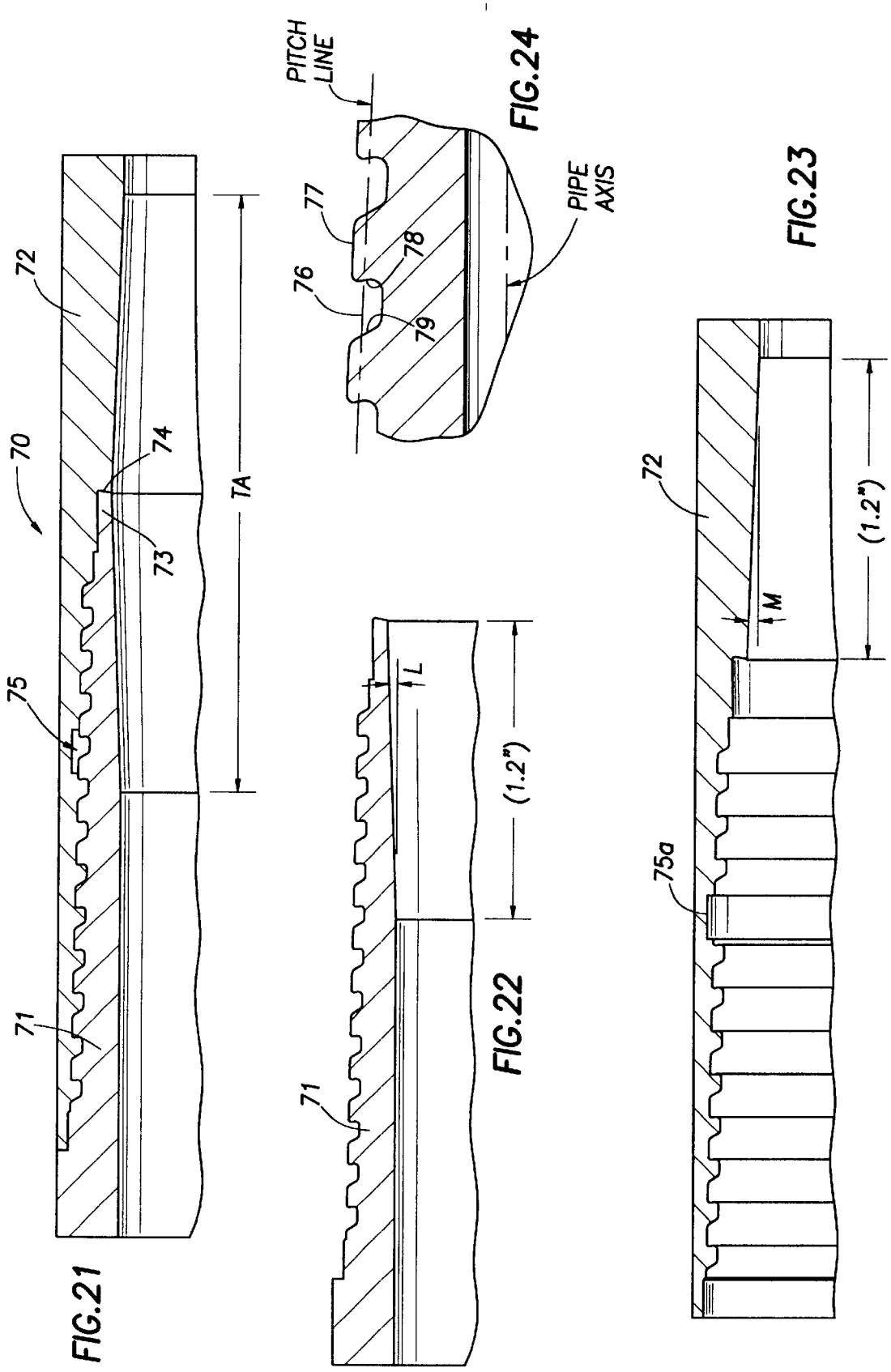

EXPANDABLE JOINT CONNECTOR

BACKGROUND OF THE INVENTION

1. Field of the Invention

The present invention relates generally to methods and apparatus for connecting tubular bodies. More specifically, the present invention relates to methods and apparatus for effecting a secure mechanical engagement and seal in the connected ends of pipe sections that are expanded radially to form an increased internal diameter pipe string.

2. Description of the Prior Art

A new technique for casing well bores expands the well casing pipe radially after the casing pipe string has been lowered into a well bore. The casing string is enlarged radially by moving an oversized forging tool, or "pig," through the string, causing the string to expand radially beyond its original radial dimensions. This technique allows subsequent strings of casing to be lowered through the previously enlarged casing string sections and thereafter similarly expanded. The result is a well cased by a series of linked sections of casing having substantially the same internal diameters. The procedure is explained in greater detail in U.S. Pat. No. 5,348,095, assigned to Shell Oil Co.

Conventional casing strings are made up of a series of individual pipe joints secured together at their ends by threaded connections. Typically, a joint of casing is approximately 40 feet in length and has a threaded male "pin" connection at one end of the joint and a threaded female "box" connection at the opposite joint end. The joint may have a pin at each end, with the box connection being formed by a short coupling threaded onto one of the pin connections. Some casing is made with the box connection integrally formed at one end of the casing joint. These integral box connections may be radially larger than the pipe body, or they may be the same size. In the latter case, the connection is called a flush joint connection.

The threaded engagement between a properly secured pin and box connection in a conventional casing joint is effective in maintaining a secure mechanical connection that holds the string together and effectively seals the internal casing area from the formation well bore environment. When the casing string is enlarged radially, a conventional connection changes dimensionally in a way that can prevent the engaged components of the connection from properly engaging and sealing. The radial expansion of a conventional connection may also weaken or otherwise damage the pin and box structure sufficiently to permit mechanical separation.

Threaded connections for oil field use mainly rely on three types of seals: either metal-to-metal shouldering seals or seals formed by engaged threads with high thread interference using thread compound to effect a seal in the void areas, or deformable seal rings entrapped in the thread area. All three seals of the se types are disabled by the radial expansion caused by the pig. In each case, following the expansion of the pin and box, the pin and box members radially separate, causing the seals to fail.

The end of the expanded pin has a natural tendency to spring back into the internal diameter of the pipe when the pig is removed. The separation and distortion following the expansion process compromises the seals located between the pin and box and creates an obstruction in the bore of the pipe. The distortion can be so great that the pin and box threads may also disengage.

A related cause of the failure of expanded connections is that the radial expansion of a conventional casing joint connection produces different degrees of permanent deformation in the pin and box. When the expanding force is removed, the pin tends to return to its original dimensions more so than does the box. The result is an annular separation between the pin and box that may permit leakage or mechanical separation.

Radial expansion of conventional connectors may also permit the connectors to leak. The sealing mechanism in many threaded pipe connections results from the engagement of metal-to-meal sealing surfaces in the pin and box. The engagement of these seal surfaces closes the annular space between the pin and box to provide a pressure seal. Radial expansion of the connection can distort or displace the sealing surfaces to permit leakage through the annular space.

Connectors that employ an elastomeric, annular seal ring between the engaged surfaces of the pin and box are also subject to leakage when the connection expands radially. The annular elastomeric seal of conventional O-ring-sealed connectors is carried in an annular groove formed in either the pin or the box, or both. The seal of such a connection is formed when the annular seal ring is compressed radially between the fully engaged pin and box. Subsequent radial expansion of the engaged connection changes the radial compression of the annular seal ring, which in turn may permit leakage through the expanded connection. The dimensional changes in the groove occurring during the expansion process may also damage the annular seal ring, permitting the seal to leak.

Conventional well pipe connections are also susceptible to splitting along the length of the box when the connections are expanded radially. The expansion process concentrates stresses of expansion in any thin wall sections present at the ends of the connected pipe segments. The acceptable tolerance for wall thickness in conventional connectors is relatively large so that a pin or box may have a non-uniform thickness that includes relatively thin wall areas without being defective. In this conventional connector, however, the concentration of the stresses induced by expansion of the connections may be sufficient to rupture or over-expand the thin section. The probability of a conventional connector having an area with a relatively thin wall section in either the box or the pin is too great to employ such connectors in pipe strings that are to be radially expanded.

SUMMARY OF THE INVENTION

An annular, elastomeric seal is carried in a non-standard annular groove formed within the threaded box of a tubular connector. An annular, spacer ring is positioned adjacent the seal ring within the groove. The dimensions of the groove and the seal ring and spacer ring are functionally related so that the seal ring is compressed axially and radially when the pin of the connection is expanded radially into the box and both the box and pin are then further expanded radially. Radial expansion of the connection causes the groove in the box to contract axially, forcing the spacer ring against the seal ring to compress the seal ring between the spacer and the opposing wall of the groove. The spacer ring assists in retaining the seal ring within the groove and also serves as a compressive wall surface to trap the seal ring and force it to expand within the groove as the groove contracts during the expansion of the connection. The expanded seal ring is extruded into the gap between the pin and box at the groove wall opposite the expansion ring to provide a pressure-tight seal.

A preferred form of the connection of the present invention is equipped with a single-taper thread section having a hooked thread form with no significant radial thread interference between the engaged pin and box components. An internal, reverse angle torque shoulder engages the end of the pin to prevent the pin end from moving radially inwardly away from the expanded box following the expansion of the connection.

The outside diameter of the box adjacent the thin section of the face of the box and the inside diameter of the pin adjacent the thin section end of the pin are machined to limit the variation of the wall thicknesses of the two connection components to prevent concentration of stresses in a thin-walled portion of either of the components during the expansion process.

Where the pig travels from the pin into the box, the pin internal diameter is less than or equal to the box internal diameter. Smooth and gradual transitions between the machined internal diameters and the "as rolled" internal diameters on the pin and box connections are also provided to limit the induced stress formed in the connection as it is expanded radially.

An elastomeric, annular seal is installed in a groove in the box between the end of the thread and the reverse angle torque shoulder provided for capturing the pin end. The annular seal is dimensioned to accommodate the radial expansion and axial contraction of the connection during the expansion process while maintaining sealing integrity. An annular spacer ring employed in the groove with the seal ring constrains the movement of the seal ring as the pin enters the box during the connection assembly and as the connection is enlarged during the expansion process to maintain the seal ring in place and to protect it from damage.

If desired, a second elastomeric seal ring may be installed in the pin of the connection between the end of the pin thread and the extreme end of the pin connection to seal against external pressure. The second seal ring is also employed with a spacer ring, and both are carried within a groove formed in the pin, with the groove having dimensions that cooperate with those of the seal ring and spacer ring to cause the seal ring to expand radially as the connection is expanded radially.

The reverse angle torque shoulder provides a positive makeup position reference to assist in assembly of the connection and also provides a mechanism to store torsional energy to resist any unscrewing of the connection after assembly. Additionally, the reverse angle torque shoulder provides radial support to the nose of the pin to prevent the pin from disengaging from the box during the expansion process.

The threads of the connection are dimensioned to provide a means to easily assemble the connection and provide a structural element for supporting the loads encountered in the running and setting of the well string. The thread taper provides a means to maximize the load-bearing sections of the connections.

The provision of free-running threads (no thread interference) enables the connections to be made up with reduced probability of galling of the thread. The use of a hooked thread form provides additional structural support to maintain the mechanical connection between the pin and box during the radial expansion of the connection. The hooked thread form also retains the pin and box together as the pin retracts after expansion. The hooked thread form also provides additional support to assist the pin from radially extending from the box and "jumping out" during application of axial tension loads.

An important feature of the present invention is the provision of a controlled thickness over the thin sections of the face of the box employed in the connection. By controlling the variation in the thickness of the thin section at the face of the box, large variations in the thickness are avoided to prevent concentration of strain in the thinner portions, which causes the thin portion to split during the expansion process. Splitting of the thin sections can permit the connection to leak and fail structurally, causing disengagement of the box and pin.

In a preferred form of the invention, at the face of the pin, the internal diameter of the box of the connection is substantially the same as that of the pin. If the box internal diameter is significantly smaller than the pin internal diameter at the internal interface between the pin and box connection, the box will radially expand more than will the pin. This greater radial expansion can significantly reduce, or completely eliminate, the contact of the seal ring between the pin and box, causing leakage. The greater radial expansion of the box may also lessen or eliminate the radial engagement of the thread flanks. A reduction or elimination in the radial engagement of the thread flanks may lead to an inability of the threads to maintain adequate structural support for the applied loads, causing the connection to disengage.

The pin and box connections of the preferred form of the present invention are provided with substantially concentric internal diameters to further ensure that the pin and box are radially expanded to the same extent. The provision of uniform wall thicknesses in the pin and box connectors, as well as the provision of substantially identical internal diameters between the pin and box is ensured by machining the connection in the critical areas to prevent normal variations occurring in conventional pin and box connectors.

Any changes in the internal diameter sections of the connection are held at smooth and gradual transitions to prevent abrupt changes that may disrupt the passage of the expansion device as it moves through the connection.

The annular seal ring of the present invention is positioned between the engaged pin and box in a way to prevent or reduce passage of well bore fluids from the inside of the pipe, even after the connection has been expanded radially. The dimensions of the annular seal ring are selected to maintain an adequate "squeeze" after the expansion of the connection to create and maintain a desired seal between the engaged pin and box.

The annular backup ring employed in conjunction with the annular seal ring prevents the seal ring from being either partially or completely moved out of the seal assembly groove during the assembly of the connection. The backup ring also prevents the annular seal ring from being partially or completely pushed out of the seal ring groove during expansion of the connection.

If desired, the seal of the present assembly may also be employed as an external seal within a groove in the pin connection between the end of the thread and the external shoulder of the pin. The annular seal ring and spacer ring of the external seal are dimensioned as with the case of the internal seal assembly employed in the box so that the seal ring expands radially into sealing engagement between the pin and box during the expansion process. The primary purpose of the second seal assembly is to provide better resistance to the passage of fluid from the outside of the pipe into the inside of the pipe. Placement of the optional seal ring assembly at this position provides better resistance to the passage of fluid from the outside of the pipe because of its presence in a substantially thicker section of the pin, which provides more resistance to radial separation between the pin and box seal surfaces under pressure loads.

By employing an elastomeric annular seal ring in a groove having dimensions that cause the seal ring to extend radially when the connection carrying the seal is expanded radially, an effective seal is maintained between the expanded pin and box. In addition, by maintaining a uniform thickness around the circumference of the box counterbore by machining the connection or otherwise closely controlling the connection thickness, the effects of plastic strain induced during the expansion process are distributed evenly to prevent splitting of the box connection. The machining step also ensures that a high degree of concentricity is maintained between the internal diameter of the engaged pin and box connections. This permits the forging pig to pass through the connection without hindrance and prevents a high degree of differential expansion between the pin and box connection to prevent disengagement of the threads and/or seals.

Conventional flush joint connections are machined on plain end pipe, with the pipe end being swaged and then machined to a significantly smaller diameter than the pipe. The resulting difference in internal diameter between the pin and box of these connections creates an abrupt change in the connection geometry that can hinder the passage of the pig. The present invention provides a machine surface on the pin's internal diameter, which is substantially the same diameter as the mating box connection, to prevent the abrupt change in connection geometry.

Casing formed by electric resistance welding, rather than seamless casing, has a more uniform body wall and is preferred for use in an expanded casing string.

From the foregoing, it will be appreciated that an object of the present invention is to provide a method for radially expanding connected tubular bodies to produce a larger internal diameter within the connection, with the enlarged connection being mechanically secure and leakproof.

It is also an object of the present invention to provide a method for radially expanding a threadedly engaged tubular connection to provide a connection that remains securely engaged and leakproof after being expanded.

Yet another object of the present invention is to provide a method for radially expanding a string of joined casing pipe sections within a well bore with each of the expanded joint connections remaining securely engaged and sealed to ensure leakproof support of the string in the well bore.

An important object of the present invention is to provide a seal assembly that can be employed between superimposed, inner, and outer tubular bodies to produce a seal when the inner body is expanded radially into the outer body and both bodies are then together expanded radially.

It is also an object of the present invention to provide an engaged pin and box connection having a seal assembly that can be expanded radially to compress the seal assembly between the pin and box to form a seal in the expanded connection.

Yet another object of the present invention is to provide a seal for a pin and box connection that is compressed axially and radially as the connection is radially expanded to provide a seal between the expanded pin and box.

Another object of the present invention is to provide a pin and box connection in which the pin nose is engaged mechanically and locked with the box to prevent the pin nose from contracting radially away from the box after the connection is expanded radially.

It is yet another object of the present invention to provide a pin and box connection having threads that interlock to prevent mechanical separation of the threads when the connection is expanded radially.

An important object of the present invention is to provide a pin and box connection that is resistant to failure at a thin-walled area of either the pin or the box when the connection is expanded radially.

BRIEF DESCRIPTION OF THE DRAWINGS

FIG. 1 is a partial vertical sectional view through a well bore illustrating a conventional method for casing a well with each deeper section of casing having a smaller internal diameter;

FIG. 2 is a partial vertical sectional view through a well bore illustrating a string of flush joint casing run in a well bore prior to being expanded radially;

FIG. 7 is a partial sectional view illustrating an engaged pin and box connection with a box seal ring of the present invention;

FIG. 7A is an enlarged sectional view illustrating details in the construction of the unexpanded box seal;

FIG. 7B is an enlarged sectional view illustrating details in an expanded box seal;

FIG. 8 is a partial sectional view illustrating a tubular connection having a pin and box seal assembly of the present invention;

FIG. 8A is an enlarged partial sectional view illustrating details in the construction of the pin seal assembly of FIG. 8;

FIG. 9A is an enlarged view of the seal area of FIG. 9 illustrating details in the operation of the pin seal assembly of the present invention as it is being extended radially outwardly;

FIG. 15 is an end view, in elevation, of the spacer ring of the present invention;

FIG. 16 is a cross-section taken along the line 16—16 of FIG. 15 illustrating details in the spacer ring of the present invention;

FIG. 17 is a vertical elevation illustrating the annular seal ring of the present invention;

FIG. 18 is a cross-sectional view taken along the line 18—18 of FIG. 17 illustrating the cross-section of the seal ring of the present invention;

FIG. 19 is a table showing the relationship between desired pipe body expansion and dimensions of the components of the seal assembly;

FIG. 20 is a table showing the relationship between the pipe body expansion and the characteristics and dimensions of the expanded components of the seal assembly of the present invention;

FIG. 21 is a partial sectional view of an engaged pin and box connection of a modified form of the present invention;

FIG. 22 is a partial cross-sectional view illustrating details in construction of a pin portion of the connection of the present invention;

FIG. 23 is a partial cross-sectional view illustrating details in the box construction of the modified form of the box connection of the present invention; and FIG. 24 is a partial cross-sectional view illustrating details in the thread construction of the pin and box connection of the present invention.

DESCRIPTION OF THE ILLUSTRATED EMBODIMENTS

Figure 3:
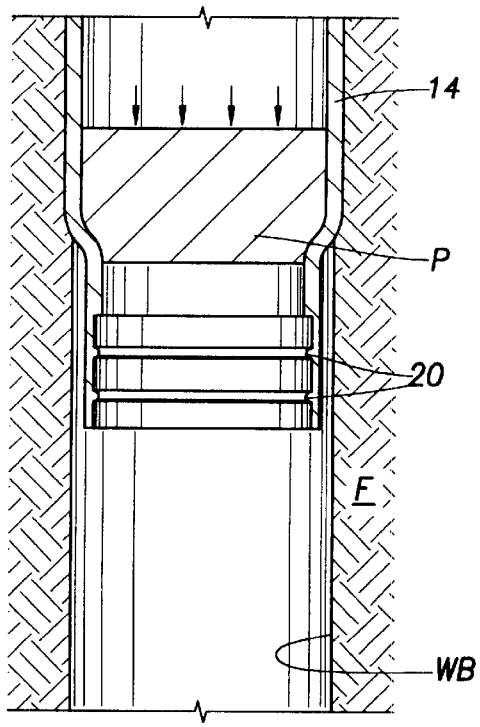
FIG. 3 is a partial vertical sectional view of a well casing being expanded radially into a surrounding well formation by a forging body moving downwardly through the casing.

FIG. 1 indicates a conventional completion of a well bore WB drilled through a formation F in which successively set casing sections 11, 12, and 13 are cemented in deeper sections within the well bore. Since it is necessary to lower the casing section 12 through the casing section 11, the casing section 12 must be of a smaller external diameter than the internal diameter of the casing section 11. When drilling very deep wells, the described prior art process requires that the well have a relatively large initial well bore at the surface in order to have a suitably large well bore adjacent the subsurface producing formation.

FIG. 1 illustrates a conventional liner-type casing completion. In some wells, one or more of the strings 12 and 13 may extend all the way back to the surface rather than being suspended from the casing section immediately above. Some formation problems encountered in certain areas may prevent the typical casing program from being employed because of the risk of breaking down the subsurface formation and losing well circulation or otherwise losing control of the well.

FIG. 2 illustrates a string 14 of casing being run into a well bore WB drilled through the formation F. The string is comprised of a series of connected casing joints such as the joints 15, 16, 17, and 18 that are secured by connections 15a, 16a, and 17a as indicated to form an elongate string that extends to the well surface. The casing string 14 is illustrated as being made up of individual casing joints of approximately 40 feet in length, with a flushjoint connection between the adjoining casing joints. In accordance with the present invention, the casing string 14 is to be radially expanded into engagement with the surrounding well bore WB using a forging device that passes internally through the casing string 14 and the connections 15a, 16a, and 17a of the present invention.

FIG. 3 illustrates a pig P being forced down through the casing string 14 by a suitable force, such as hydraulic pressure, causing the casing string to expand radially into engagement with the wall of the surrounding well bore WB. The casing string 14 is, in one form of the invention, expanded radially until the internal diameter of the string is approximately the same dimension as the internal diameter of the well bore below the expanded area of the casing. The lower internal surface of the casing string 14 is provided with a reduced wall thickness and annular ridges 20 that are employed to secure the next string of casing.

While the pig P is illustrated as being applied to the casing string 14 from the surface downwardly toward the bottom of the casing string, it will be understood that in practical applications, the forging device may actually be carried at the bottom of the casing string and be activated with the string in place to force the pig from the bottom of the string back toward the well surface. The particular means for moving the forging element through the well string and details in the construction of the forging element are not a part of the present invention.

Figure 4:
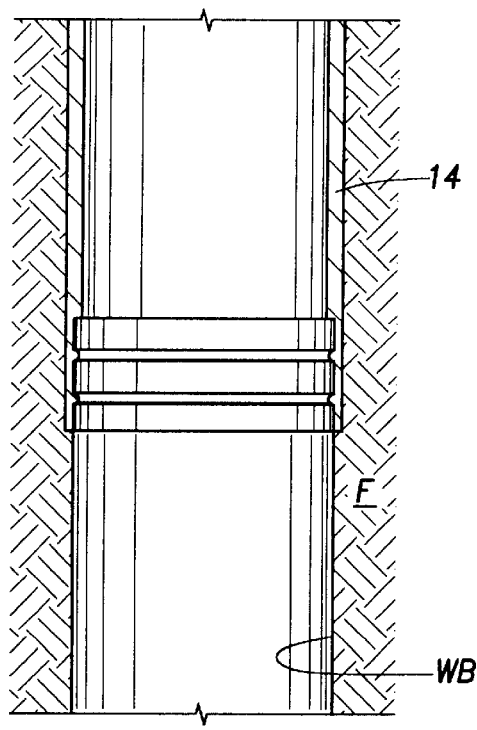
FIG. 4 is a partial vertical sectional view illustrating the bottom end of an expanded casing string in a well bore.

FIG. 4 illustrates the casing string 14 fully expanded into the surrounding well bore WB.

Figure 5:
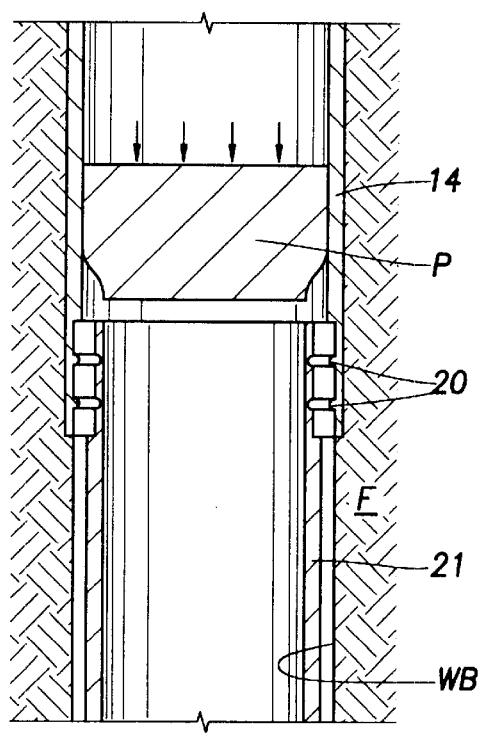
FIG. 5 is a partial vertical sectional view illustrating a forging tool being advanced from a previously expanded casing section into a smaller, unexpanded casing section.

FIG. 5 illustrates the pig P being advanced into the top end of a second section of casing 21 positioned with its uppermost section within the lowermost section of the casing string 14. The casing section 21 has an external diameter that is less than the internal diameter of the expanded casing string section 14.

Figure 6:
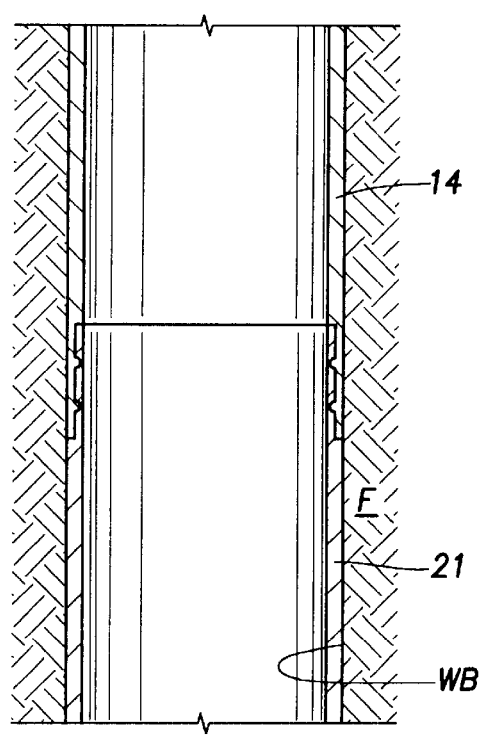
FIG. 6 is a partial vertical sectional view illustrating a lower casing section expanded radially into a surrounding well bore and a surrounding casing with the resulting casing string having an internal diameter substantially the same as that of the upper string of casing.

FIG. 6 illustrates the casing section 21 expanded radially into engagement with the surrounding formation F and mechanically secured by the forged mechanical interlock between the top of the casing section 21 and the lower end of the casing section 14. The manner of connecting the top of casing section 21 to the lower end of casing section 14 is exemplary and is not a part of the present invention. Following the radial expansion of the casing section 21, the well bore WF is cased along its entire length by a single string of casing having an internal diameter substantially equal to the internal diameter of the original well bore into which the casing string 14 was run.

FIG. 7 illustrates a cross-sectional view of a connector of the present invention indicated generally at 25. The connector 25 includes a pin section 26 and a box section 27. The threads engaging the pin and box are of a hooked type formed along a single taper. While a specific form of thread profile and configuration is illustrated for purposes of describing the connection and seal of the present invention, it may be appreciated that any suitable thread form may be employed in the present invention. Preferably, the thread form provides a mechanically locking or hooking-type thread that is formed along a single taper.

The connector 25 includes an annular seal assembly indicated generally at 28 comprised of an annular elastomeric seal ring 29 and an annular spacer ring 30. The seal ring and spacer are carried in an annular groove 31 formed within the base of the threads within the box 27. In a preferred form, the seal ring 29 is constructed of a suitable resilient material, such as a fluorocarbon compound, and the spacer ring 30 is constructed of a less resilient material, such as a polytetrafluoroethylene-containing, i.e., Teflon-containing compound.

FIG. 7A illustrates details in the construction of the annular seal assembly 28 and pin nose configuration of the connector 25 of FIG. 7. FIG. 7A illustrates an example of the dimensional relationships between the annular groove 31 and the seal ring and spacer ring carried within the groove in a connection before the radial expansion of the connection. The groove 31 has a depth 31a and a width 31b. The groove depth 31a is less than that of a standard groove conventionally used in a connection with a seal ring having the dimensions of the ring 29. A conventional seal ring and groove connection provides a squeeze of approximately 11–15% where squeeze is defined as the change in the cross-sectional height of the seal ring divided by the original, undeformed cross-sectional height of the seal ring. The connection of the present invention provides a squeeze of as much as 26% or more.

The expansion ring 30 bridges the gap between the pin and box as the pin enters the box to prevent the seal ring 29 from being pushed out of the groove and into the gap between the pin nose and the box. The groove width 31b is selected such that the seal 29 is compressed during the initial makeup to only partially fill the groove 31 to thereby prevent the seal ring from extruding into the gap between the pin and box.

The seal ring 29 is preferably positioned such that the expanding tool first expands the area underlying the seal ring before expanding the area underlying the spacer ring 30. The presence of the spacer ring 30 prevents the seal ring from extruding into the gap 31c as the spacer tool advances through the connection. The expansion of the connection increases the internal radius of the pin 26 and the box 27 but does not significantly reduce the groove depth 31a. The expansion does, however, reduce the groove width 31b. The result is that the expansion process reduces the total volume defined between the annular groove 31 and the external surface of the pin 26.

As may be seen by reference to FIG. 7B, the groove volume is reduced by the expansion process, causing the resilient seal ring 29 to overfill the groove 31. The expansion ring 30 remains in contact with the external surface of the pin during the expansion process, preventing the seal ring 29 from entering the gap between the pin 26 and box 27 on the expansion ring side of the groove. The seal ring is free, however, to expand into the gap 31d at the opposite end of the groove. The extrusion into the gap 31d may occur during the initial expansion and may also occur after the pin 26 shrinks away from the box 27 following passage of the expansion tool. The resulting extruded sealing area 29a of the seal ring 29 assists in providing the seal between the expanded pin and box.

Use of a single spacer ring 30 on only one side of the seal ring 31, rather than a spacer ring on each side of the seal ring, permits the compressed seal ring to extrude out of the groove 31 to enhance the sealing effect between the connection components. The single spacer ring maintains the seal ring in place during assembly and expansion without limiting the extrusion of the ring into the gap resulting after the connection expansion.

FIG. 8 is a cross-sectional view of a modified form of the connection indicated generally at 32. The connection 32 of the present invention includes a box section 33 and a pin section 34. An annular seal assembly 35 is provided at the base of the threads of the pin 34 to provide a seal between the external well bore environment and the engaged thread area of the connector 32. The seal assembly 35 includes an annular, elastomeric seal ring 36 and an annular spacer ring 37 carried in an annular groove 35a. The base of the box connector 33 is provided with an annular seal assembly 38 that prevents pressure leakage from the area within the tubular connector. The annular seal assembly 38 includes an elastomeric seal ring 39 and an annular spacer ring 40.

FIG. 8A illustrates details in the seal assembly 35. As may be noted by reference jointly to FIGS. 7A and 8A, the seal assemblies 28 and 35 do not completely fill the grooves 31 and 35a within which they are positioned. The purpose of this dimensional relationship between the seal assemblies and the grooves will be explained hereafter in greater detail.

Figure 9:
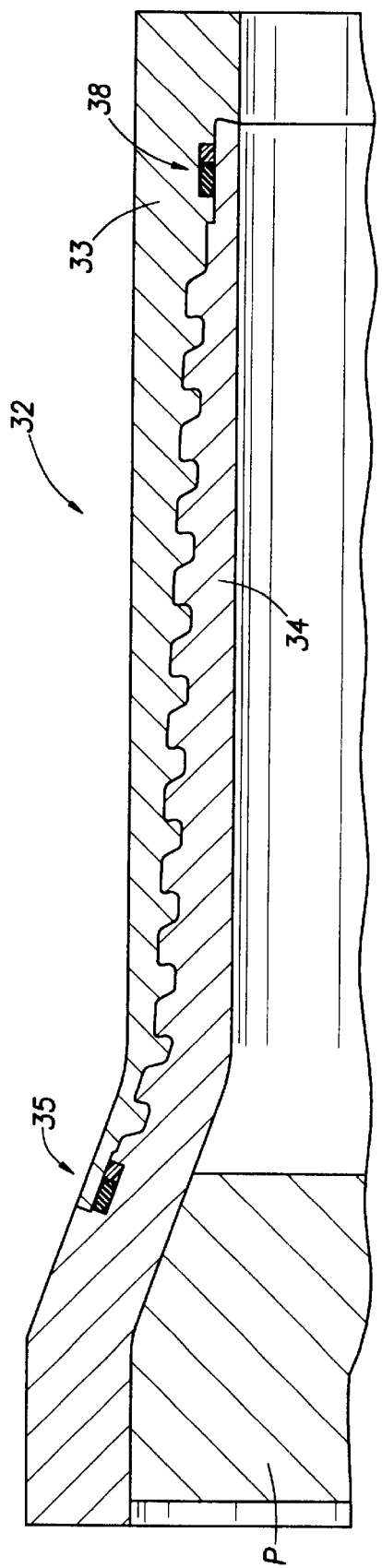
FIG. 9 is a partial cross-sectional view illustrating a forging element being passed through a connection of the present invention at the initial entry into the connection.

FIG. 9 illustrates the pig P as it advances through the connector 32 of the present invention. The illustrated expansion process occurs with the pig P advancing from the pin toward the box of the connection. It may be appreciated that the expansion process may be reversed with the pin first expanding the box and subsequently, the pin.

FIG. 9A illustrates details in the operation of the seal assembly 35 as the connection is being expanded. During this initial expansion, the spacer ring 37 assists in limiting the movement of the seal ring 36 to prevent damage to the seal ring and to provide a backup surface against which the seal ring 36 will react during the latter part of the expansion to expand radially outwardly, thereby maintaining a seal between the pin and box connection. FIG. 9A also illustrates the locking engagement between the hook threads of the pin and box, which assist in preventing the pin and box connections from separating during and after the expansion process. The illustrated thread form is provided with a negative load flank to achieve this purpose. One embodiment of the invention employed pin and box threads having a lead of 0.2000 in/in; a thread height that allows the maximum efficiency of the connection (no thread interference); and a thread taper that optimizes the overall length of the connection. A form of the invention suitable for expansion of up to 20% of the pipe outside diameter employed a premium connection with a five-thread-per-inch, one-inch-per-foot taper, a 0.050-inch thread height, a negative load flank, and a positive stab flank. It will be appreciated that other thread forms and locking configurations may also be employed to achieve the desired retention between the expanding pin and box connection.

Figure 10:
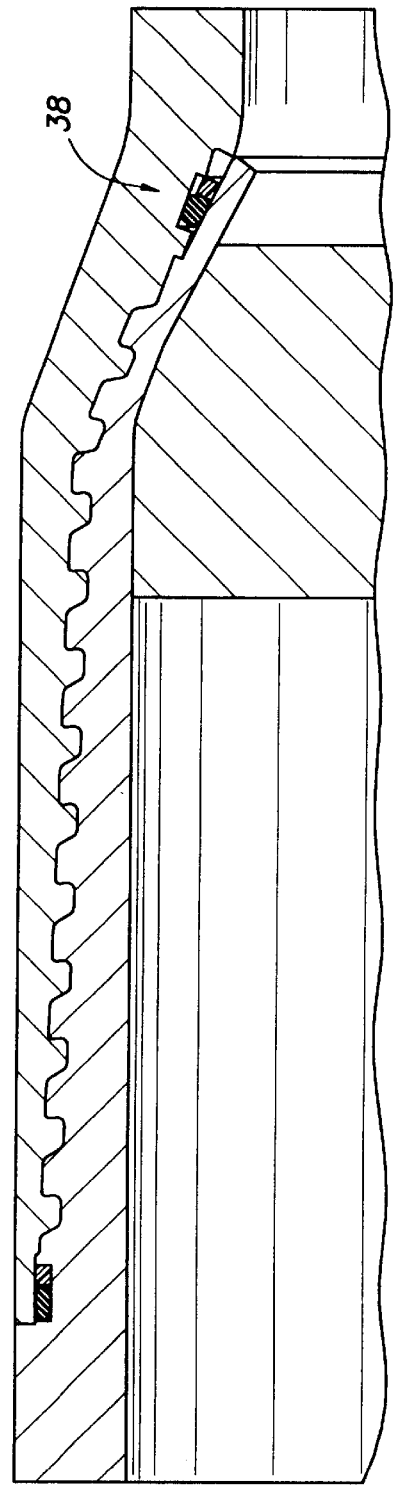
FIG. 10 is a partial sectional view of the connection of FIG. 9 being radially expanded by the expansion device, in an intermediate phase of the expansion.
Figure 10A:
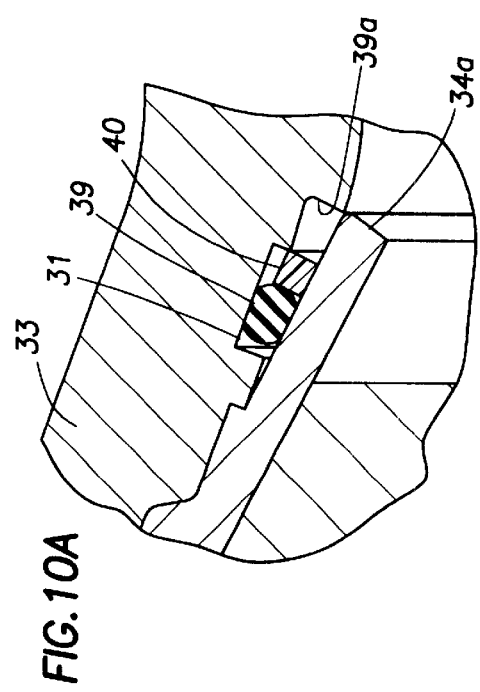
FIG. 10A is an enlarged view of the seal section of FIG. 10 illustrating details in the box seal assembly of the present invention.

FIG. 10 illustrates details in the expansion of the seal assembly 38. A detailed view of the seal area of the assembly 38 is illustrated in FIG. 10A. Before the connector is expanded, the seal ring 31 and spacer ring 40 are seen to occupy less than all of the volume defined by the annular groove 39 and the pin nose. The nose of the pin is also illustrated deflected radially inwardly away from the surrounding box connection during the initial phase of the expansion of the pin nose. An internal reverse angle torque shoulder 39a is formed at the base of the threads of the box section 33. As will hereinafter be more fully described, the shoulder 39a functions to hold the reversely tapered nose end 34a of the pin section in its expanded position after the connection has been fully expanded.

Figure 11:
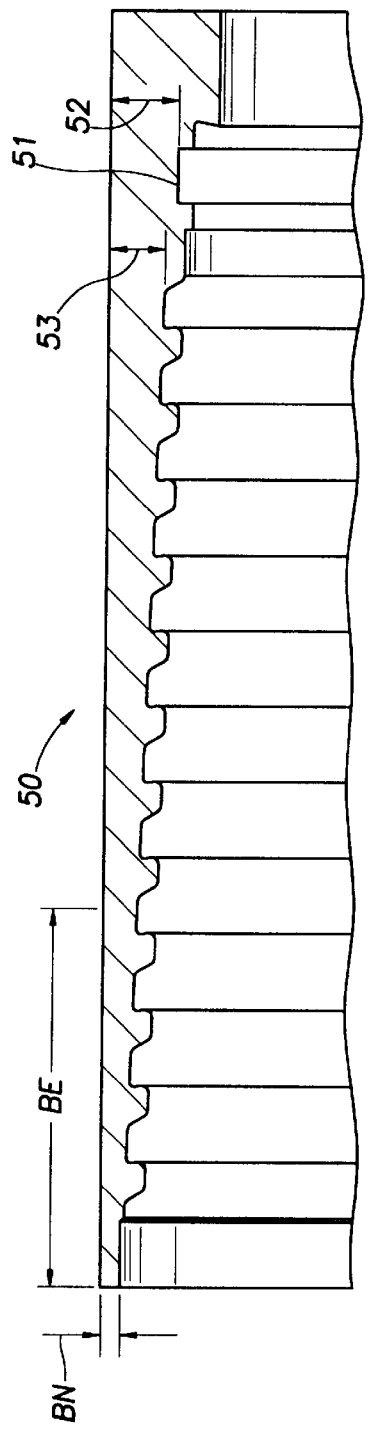
FIG. 11 is a partial sectional view of a box of a single-taper, hooked-thread connector of the present invention illustrating details in the seal groove of the connection.

FIG. 11 illustrates details of a box 50 of the present invention. The wall thickness dimension BW at the face end of the box is maintained uniform around the entire circumference of the box to prevent relatively thin-walled areas from occurring in the box. A suitable length of the external area indicated at BE is machined to ensure that the box wall is of uniform thickness in the area BE throughout the entire circumferential development of the box. In a box of 5.5-inch OD flushjoint pipe, the dimension BE may be approximately 1.5 inches or more. The dimension BW for 5.5-inch pipe is preferably greater than 0.055 inches. The ratio of the cylinder minimum wall/maximum wall thickness for the connection at the face of the box is preferably greater than or equal to 0.700. In general, the preferred connection employs a thickness of the cylinder wall that is greater than 0.055 inches, with the ratio of the minimum wall of the box cylinder at the face divided by the maximum wall thickness at the face being greater than 0.700. Connections having these designs are resistant to splitting during the expansion process. For most casing sizes to be used in the process of the present invention, these dimensions are met by machining the outside diameter of the box a minimum length of 1.5 inches from the face and physically verifying with a thickness gauge that the wall thickness and wall thickness ratios are met. Any other suitable technique for ensuring that the wall thicknesses are uniform may also be employed.

The box connection 50 preferably includes an annular groove 51 in which the cross-sectional area 52 of the groove is greater than or equal to the box critical cross-sectional area 53.

Figure 12:
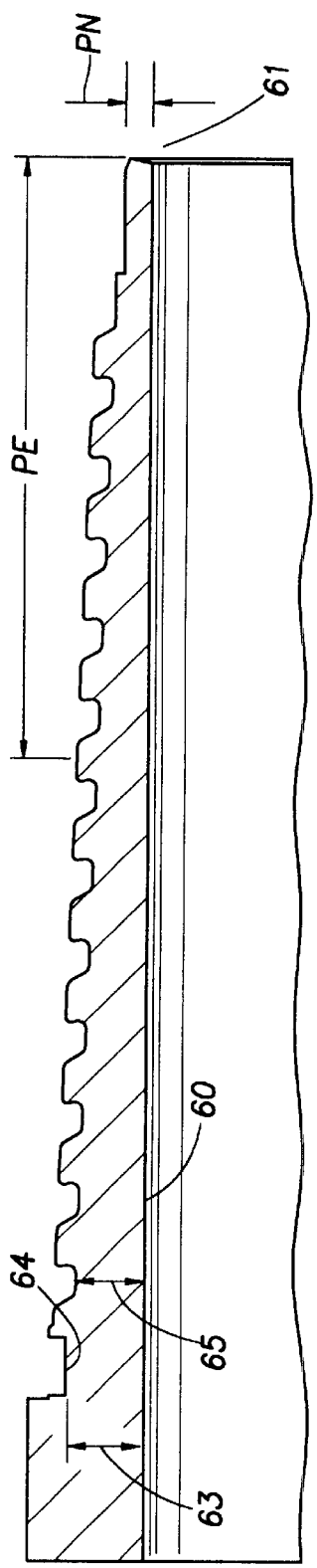
FIG. 12 is a partial sectional view of a pin connector of the present invention illustrating details in the pin end configuration.

FIG. 12 illustrates details in the construction of a pin 60 of the present invention. The pin nose 61 is tapered to be engaged by and retained within the internal reverse angle torque shoulder formed at the base of the box. An internal area PE extending back from the pin nose is machined to ensure proper, uniform wall thickness of the pin. In a connector for a 5.5-inch OD flush joint pipe, the area PE may be approximately 1.5 inches. The pin nose thickness PW is preferably greater than or equal to 0.050 inches. The cross-sectional area at 63 of the groove 64 is greater than or equal to the cross-sectional area of the pin critical cross-sectional area at 65.

Figure 12A:
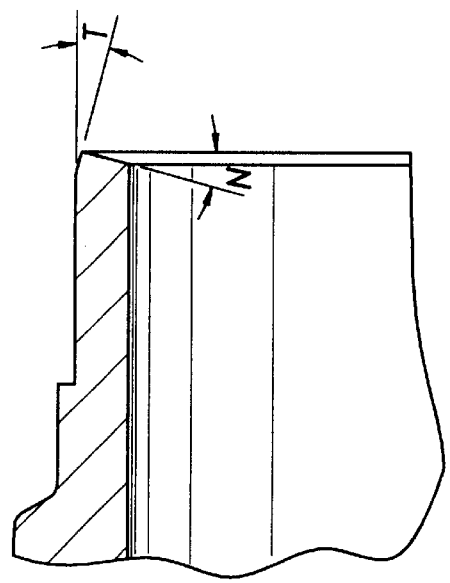
FIG. 12A is a cross-sectional view, in enlarged scale, illustrating details in the construction of the end of the pin of FIG. 12.

With reference to FIG. 12A, illustrating details in the pin end configuration, a transition angle T is machined on the pin to allow the annular seal ring to slide into position during the makeup of the pin into the box of the connection. In a preferred form of the invention, the angle T may be approximately 10°. The taper angle N of the pin end may be approximately 15°.

Figure 13:
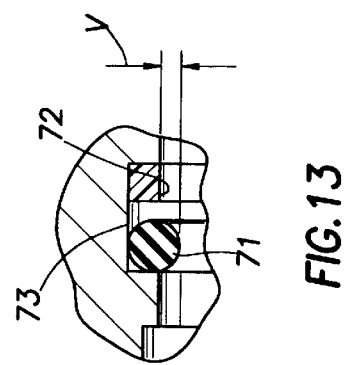
FIG. 13 is a partial sectional view illustrating details in the construction of the groove, annular seal ring and annular spacer ring assembly employed in a box connection of the present invention.

FIG. 13 illustrates details in the cross-section of the box groove of the present invention. An elastomeric O-ring seal (seal ring) 71 is illustrated adjacent an annular spacer ring (position ring) 72 within an annular groove 73. The seal ring 71 is seen to extend radially inwardly beyond the groove before the pin and box of the connection are engaged. The spacer ring 72 extends radially approximately the same radial dimension as the groove 73. The amount of radial extension of the seal ring 71 beyond the face of the groove is indicated by the dimension V. During makeup of the connection, the position ring 72 provides an axial bearing surface for the seal ring 71. This prevents the seal ring 71 from being sliced or torn apart by engagement in the groove wall during makeup. In one form of the invention, the position ring is selected to interfere with the pin nose on all pipe diameters in the range of 0.002 inches to 0.006 inches interference per radius. The initial gap between the box back cylinder and the pin nose cylinder on all pipe diameters is in the range of 0.006 inches to 0.014 inches.

Figure 14:
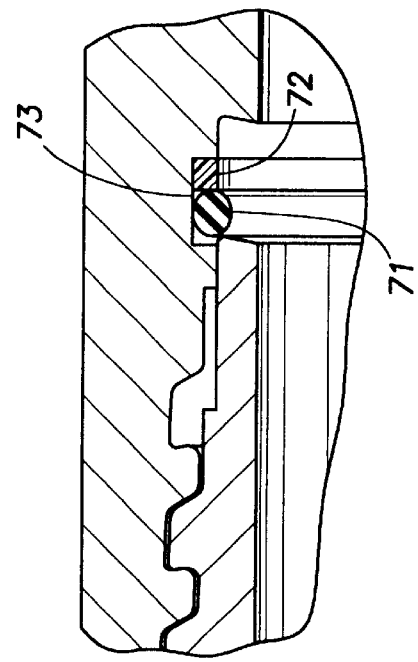
FIG. 14 is a partial sectional view illustrating details in the makeup of a pin and box connection as it first engages the seal assembly of the present invention.

FIG. 14 illustrates the connection of the present invention during the advance of the pin into the box. In this position, the pin nose slides under the seal ring 71 and moves into the position ring 72. In the illustrated form of the invention, the interference between the OD of the pin nose and the ID of the position ring is in the range of 0.002 inches to 0.010 inches on the radius. The position ring maintains the seal ring in the groove during the makeup of the connection.

FIGS. 15 and 16 illustrate details in the spacer ring 65 of the present invention. For use with a 5.5-inch outside diameter connection, the spacer ring is provided with an internal diameter of 4.994 inches, an external diameter of 5.104 inches, a thickness of 0.055 inches, and a width of 0.067 inches. In a preferred form of the invention, the position ring 65 is constructed of virgin Teflon with 25% fiberglass filler. All sharp edges are removed from the position ring to assist in its ease of movement through the groove and to prevent damage to the adjacent seal ring. Other compositions may beneficially be employed for the position ring 65, including a 100% Teflon composition.

FIGS. 17 and 18 illustrate an elastomeric, annular seal ring 66 employed in the seal assembly of the present invention. The seal ring may be constructed of any suitable material, such as a fluorocarbon V 747-75 compound with a Shore A durometer range of 70–75.

FIG. 19 is a table illustrating the relationship between the percent expansion of the pipe body and characteristics or dimensions of the seal ring, groove width, and spacer ring of the present invention. As indicated in FIG. 19, a body expanded 10% is provided with a seal ring ("O-ring") having a cross-section of 0.070 inches ±0.003 inches. When employed with a spacer ("positioning ring"), the groove width for the seal is 0.156 inches ±0.002 inches. For the illustrated O-ring selection, the position ring should occupy more than 49.5% of the volume of the groove. The O-ring should occupy less than 41% of the volume of the groove. With this combination of seal ring and position ring, less than 9.5% of the groove volume is not filled. FIG. 19 provides the relationship between the seal ring, O-ring, and groove dimensions for various combinations of pipe expansions and O-ring cross-sectional, groove width, and ring volumes.

FIG. 20 is a table that shows the relationship between the percent pipe body expansion, the seal ring cross-section, the groove width with position rings, and the percentage of squeeze before and after expansion of the connection. Thus, for a 10% expansion of the pipe body and an O-ring cross-section of 0.070 inches ±0.003 inches, a groove width with position ring of 0.156 inches ±0.002 inches, the percentage squeeze before expansion is greater than 28.0%, and the required percentage squeeze after expansion is greater than 26.0%. The O-ring squeeze is calculated employing the assumption that the diameter of the O-ring seal would reduce by 10% at the initial 10% of the expansion process and 5% more during the last 20% of the expansion process. The O-ring seal and position ring volume will remain constant during the expansion process. The groove diameter and pin nose cylinder diameter will expand 1 to 1 with the expansion percentage. The groove width will decrease during the expansion process. Limiting the total groove volume not filled after installing the O-ring and position ring will accommodate the expansion process so that the area between the engaged and expanded pin and box is bridged by the O-ring seal.

FIG. 21 illustrates a modified form 70 of the connection of the present invention. The connection 70 includes a pin connection 71 and a box connection 72. A nose section 73 of the pin 71 is provided with a reversed angle tapered face that engages a reverse angle torque shoulder 74 formed in the box. A compressible seal assembly 75 is provided in a groove formed in the box section 72. The internal diameters of the pin section 71 and box section 72 are tapered radially outwardly along the area indicated at TA. In a 5.5-inch OD connection, the length TA is approximately 2.4 inches. In this connection, the connection efficiency is equal to 45.11%; the pipe body area equals 4.9624 square inches; the critical area box equals 2.2384 square inches; the pin critical area equals 3.1036 square inches; the shear force area equals 2.7980 square inches; the thread flank area equals 5.6632 square inches; the bearing area equals 3.2677 square inches; the torque shoulder area equals 1.2252 square inches; and the maximum yield torque equals 4246 foot pounds.

FIG. 22 illustrates additional details in the connection 70. The pin connection is seen to include a taper angle L of approximately 2° that extends approximately 1.2 inches from the nose of the pin back towards the body of the pin connection.

FIG. 23 illustrates details in the box of the connection 70. The box section includes an angle M of approximately 2°, providing the internal taper of the section and extending approximately 1.2 inches from the torque shoulder. The connection includes a hook thread with a seal ring groove 75a cut in the box thread to receive the seal assembly.

FIG. 24 illustrates details in the structure of the hook thread of one form of the threads that may be employed in the connectors of the present invention. The threads are formed along a single taper 76 of the threaded area, and the thread flanks 77 are parallel to the taper. The threads have a negative load flank 78 and a positive stab flank 79.

The preferred form of the invention as described herein is preferably machined on pipe in an integral joint type of configuration where a pin connection is machined on one plain end of the pipe and a box connection is machined on the other plain end. Other embodiments are possible and feasible as well. For example, instead of plain pipe ends, one end or both of the pipe ends could be either internally and/or externally upset. Additionally, rather than the pipe being threaded with a pin on one end and a box on the other end, the pipe may be threaded with either a pin and/or box on both ends and connected with a pin-by-pin or box-by-box coupling. The pipe ends in this latter configuration may be either plain end and/or internally and/or externally upset.

If desired, the pipe ends may be either expanded and/or swaged. This pipe may then be threaded pin-by-box and connected by connectors that are threaded pin-by-box. It will be appreciated that the outside diameters of the pin and box connections need not necessarily be the same. The threads of the connection also need not necessarily be threaded on a taper. If desired, the threads may be machined without a taper, or there may be provided two thread steps that are radially separated. In the two-step configuration, the threads may be straight or tapered, or a combination of both.

While the preferred form of the present invention does not employ radial thread interference, the threads may have such radial thread interference without detrimental effect in a suitable design. Moreover, if desired, the threads may be of the "wedge thread" type, where both the stab and load flank are hooked.

The reverse angle torque shoulder provided in the box may not be required where wedge-type threads are employed. The torque shoulder in such applications may be a conventional 90° angle shoulder or may be dispensed with altogether. Similarly, if the length of the pin nose is sufficiently long, a reverse angle torque shoulder may not be required.

If desired, the connection may be provided with an external torque shoulder located at the face of the box and/or an intermediate torque shoulder provided between two thread steps.

The box internal diameter at the interface between the pin and box connection may be substantially larger than the pin, provided there is a smooth and gradual transition between the two internal diameters of the pin and box. If desired, the internal diameter of the box at the interface between the pin and box connection maybe substantially larger than the pin ID without a smooth and gradual transition, provided that the expanding device is moving in a direction such that the device is exiting the pipe having the pin connection and entering the pipe end having the box connection.

The foregoing description and examples illustrate selected embodiments of the present invention. In light thereof, variations and modifications will be suggested to one skilled in the art, all of which are in the spirit and purview of this invention.

What is claimed is:

1. A method for sealing a connection between adjoining tubular bodies comprising:
   threadably engaging a threaded axial end of a first tubular body within a threaded axial end opening of a second tubular body whereby an annular area is defined between said first and said second tubular bodies;
   disposing a sealing component in said annular area between said first and second tubular bodies; and
   radially expanding said first and said second tubular bodies to compress said sealing component between said first and second tubular bodies to seal the annular area between said first and second tubular bodies.

2. The method as defined in claim 1 wherein said sealing component comprises an elastomeric seal ring and a separate spacer ring.

3. The method as defined in claim 2 wherein said seal ring is comprised of a fluorocarbon compound and said spacer ring is comprised of a polytetrafluoroethylene-containing compound.

4. A method for forming a seal between telescopically and threadably engaged, tubular bodies comprising:
   disposing a seal component in an overlapping annular area between first and second telescopically and threadedly engaged tubular bodies; and
   radially expanding said first and said second tubular bodies to compress said seal component for forming a seal between said first and second tubular bodies in said overlapping annular area.

5. The method as defined in claim 4 wherein said seal component comprises an elastomeric seal ring and a separate spacer ring.

6. The method as defined in claim 4 wherein said seal component is carried in an annular groove formed in one of said first and said second tubular bodies in said overlapping annular area.

7. The method as defined in claim 5 wherein said seal ring is comprised of a fluorocarbon compound and said spacer ring is comprised of a polytetrafluoroethylene-containing compound.

8. A method for sealing telescopically engaged tubular bodies comprising:
   threadably engaging a threaded axial end of a first tubular body into a threaded axial end of a second, larger diameter tubular body whereby said second body overlaps said first body in an axially extending threaded annular area adjacent the axial ends of said first and said second tubular bodies;
   disposing a deformable sealing component in said axially extending threaded annular area between said first and second tubular bodies;

radially expanding said first and said second tubular bodies; and compressing said deformable sealing component during said expanding for forming a seal between said first and said second tubular bodies in said axially extending threaded annular area.

9. A method for sealing telescopically engaged tubular bodies comprising:

inserting a threaded axial end of a first tubular body into a threaded axial end of a second, larger diameter tubular body whereby said second body overlaps said first body in an axially extending annular area adjacent the axial ends of said first and second tubular bodies;

disposing a deformable sealing component in said annular area between said first and second tubular bodies, said sealing component comprising an elastomeric seal ring and a separate spacer ring; and radially expanding said first and said second tubular bodies.

10. The method as defined in claim 9 wherein said seal component is carried in an annular groove formed in one of said tubular bodies in said axially extending threaded annular area.

11. The method as defined in claim 10 wherein a squeeze percentage of said seal ring before expansion of said tubular bodies is greater than 15%.

12. A method of sealing an engaged threaded connection between a threaded tubular pin member and a threaded tubular box member comprising the steps of:

disposing a sealing component in an annular area defined between said threaded tubular pin member and said threaded tubular box member; and radially expanding said pin member and said box member to compress said sealing component to form a seal in the annular area whereby fluids are prevented from moving axially across said annular area.

13. The method as defined in claim 12 wherein said sealing component comprises an elastomeric seal ring and a separate spacer ring.

14. The method as defined in claim 13 wherein said seal component is carried in an annular groove formed in one of said members in said annular area.

15. The method as defined in claim 14 wherein a squeeze percentage of said seal ring before expansion of said tubular bodies is greater than 15%.

16. The method as defined in claim 15 wherein said seal ring is comprised of a fluorocarbon compound and said spacer ring is comprised of a polytetrafluoroethylene-containing compound.

17. A radially expanded, sealed connection between a threaded pipe pin and a threaded pipe box made by the process of:

threadably engaging a threaded pipe pin into a threaded pipe box to form an annular engaged area between said threaded pipe pin and said threaded pipe box;

disposing an annular sealing component in the annular engaged area between said threaded pipe pin and said threaded pipe box; and radially expanding said threaded pipe pin and said threaded pipe box in said engaged area to compress said annular sealing component in said engaged area for forming a seal preventing axial fluid travel across said engaged area.

18. The method as defined in claim 17 wherein said sealing component comprises an elastomeric seal ring and a separate spacer ring.

19. The method as defined in claim 18 wherein said seal component is carried in an annular groove in said threaded pipe pin or said threaded pipe box.

20. The method as defined in claim 19 wherein a squeeze percentage of said seal ring before expansion of said threaded pipe pin and said threaded pipe box is greater than 15%.

21. A seal for a threaded connector comprising:

an internally threaded tubular box connector for receiving an externally threaded pin connector;

an annular groove formed in an internal surface of said box connector;

an annular, elastomeric seal element carried in said annular groove for engaging and sealing against said pin connector when said pin connector is received within said box connector; and an annular spacer ring carried in said annular groove whereby said spacer ring engages said seal element to retain said seal element in said annular groove when said pin is received in said box.

22. The seal as defined in claim 21 wherein a squeeze percentage of said seal element is greater than 15%.

23. The seal as defined in claim 22 wherein said seal element comprises a fluorocarbon compound and said spacer ring is comprised of a polytetrafluoroethylene-containing compound.

24. The seal as defined in claim 22 wherein said groove is formed in said threaded pipe box and said seal element is disposed between said spacer ring and a face of said threaded pipe box, whereby a nose of said threaded pipe pin engages said seal element before engaging said spacer ring as said threaded pipe pin is threadably received in said threaded pipe box.

25. A seal for a threaded connector comprising:

an externally threaded pin connector for engagement within an internally threaded box connector;

an annular groove formed on an external surface of said pin connector;

an annular, elastomeric seal element carried in said groove for engaging and sealing against said box connector when said pin connector is engaged within said box connector; and an annular spacer ring carried in said groove whereby said spacer ring engages said seal element to retain said seal element in said groove when said pin is engaged in said box wherein a squeeze percentage of said seal element is greater than 15%.

26. The seal as defined in claim 25 wherein said seal element is comprised of a fluorocarbon compound and said spacer ring is comprised of a polytetrafluoroethylene-containing compound.

27. A seal mechanism for a radially expandable connection assembly comprising:

a pin member;

a box member adapted to telescopically receive said pin member to form an overlapping annular area between said pin and box members;

an annular groove carried by one of said pin members or said box member within said overlapping area, said groove defining an annular volume within said overlapping area; and an annular, deformable seal component carried in said groove, said seal occupying less than all of said annular volume of said groove before expansion of said connection and occupying a greater percentage of said annular volume following radial expansion of said connection assembly to form a seal in said overlapping area.

28. The seal mechanism as defined in claim 27 wherein said seal component comprises an annular seal ring and a separate annular spacer ring.

29. The seal mechanism as defined in claim 28 wherein a squeeze percentage of said seal ring before radial expansion of said connection assembly is greater than 15%.

30. The seal mechanism as defined in claim 29 wherein said seal ring comprises a fluorocarbon compound and said spacer ring comprises a polytetrafluoroethylene-containing compound.

31. A seal for a pin and box connection comprising:
an axially and radially extending, externally threaded pin;
an axially and radially extending, internally threaded box adapted to threadedly receive said pin to form an annular surface between an engaged outer surface of said pin and an engaged inner surface of said box;
an annular recess in said inner surface of said box; and
an annular seal component carried in said recess, said seal component having a maximum average axial dimension at least 5% less than the maximum average axial dimension of said recess when said pin is received in said box and wherein said seal component comprises an annular seal ring and a separate annular spacer ring.

32. The seal as defined in claim 31 wherein a squeeze percentage of said seal ring in said recess is greater than 15% before said pin and box connection is radially expanded.

33. The seal as defined in claim 32 wherein said seal ring is comprised of a fluorocarbon compound and said spacer ring is comprised of a polytetrafluoroethylene-containing compound.

34. A method for forming a seal between a pin and box connection comprising the steps of:
disposing a seal component in an annular groove formed internally of a box;
engaging a pin connection into said box connection to form an overlapping annular area between the pin and box, said groove falling within said overlapping area and said seal component occupying less than 95% of the volume of said groove when said pin is fully engaged in said box; and
expanding said pin and box radially in said overlapping area to urge said seal component into sealing engagement with said pin whereby said seal component occupies substantially 100% of said groove.

35. A method for sealing a connection between adjoining tubular pipe bodies in a string of well pipe for use in a wellbore, comprising:
disposing a sealing component on one or both of a first axial end of a first tubular pipe body and a second axial end of a second tubular pipe body;
engaging said first axial end of said first tubular pipe body within said second axial end of said second tubular pipe body whereby an annular area containing said sealing component is defined between said first and said second axial ends;
disposing said string of well pipe in a surrounding well bore; and
radially expanding said first and said second axial ends toward said surrounding well bore to compress said sealing component between said first tubular pipe body and said second tubular pipe body to seal the annular area between said first tubular pipe body and said second tubular pipe body.

36. A method as defined in claim 35 wherein said string of well pipe is comprised of multiple adjoining tubular pipe bodies and further comprising radially expanding said multiple adjoining tubular pipe bodies in said string of well pipe.

37. A method as defined in claim 35 wherein said sealing component comprises an elastomeric seal ring and a separate spacer ring.

38. A method as defined in claim 37 wherein said seal ring is comprised of a fluorocarbon compound and said spacer ring is comprised of a polytetrafluoroethylene-containing compound.

39. A method as defined in claim 35 wherein said seal component is carried in an annular groove formed in one of said first and second axial ends within said annular area.

40. A method as defined in claim 35 wherein said sealing component comprises a deformable material.

41. A method as defined in claim 37 wherein a squeeze percentage of said seal ring before expansion of said tubular bodies is greater than 15%.

42. A method as defined in claim 39 wherein said second axial end comprises a threaded box connection said annular groove is formed in an internal surface of said box connection.

43. A method as defined in claim 35, wherein said first axial end comprises an externally threaded pin connection and said second axial end comprises an internally threaded box connection and wherein said pin connection and said box connection are threadedly engaged together.

44. A method as defined in claim 43 wherein said seal component is carried in an annular groove formed in an internal surface of said internally threaded box connection and wherein said sealing component comprises an elastomeric seal ring and a separate spacer ring.

45. A method as defined in claim 44 wherein said seal component is disposed between said spacer ring and a face of said internally threaded box connection whereby a nose of said externally threaded pin connection engages said seal before engaging said spacer ring when said externally threaded pin connection is initially threadedly engaged into said internally threaded box connection.

46. A method as defined in claim 45 wherein said seal component occupies less than 95% of the volume of said groove when said pin connection is fully engaged in said box connection and further comprising expanding said pin and box connections radially in said overlapping area to urge said seal component into sealing engagement with said pin connection whereby said seal component occupies substantially 100% of the volume of said groove.

* * * * *